(12) United States Patent
Kawai et al.

(10) Patent No.: US 9,123,137 B2
(45) Date of Patent: Sep. 1, 2015

(54) MOTION VECTOR COMPUTING DEVICE AND MOTION VECTOR COMPUTING METHOD

(75) Inventors: Kiyoyuki Kawai, Fukushima-ken (JP); Kenji Furukawa, Fukushima-ken (JP)

(73) Assignee: Toshiba Alpine Automotive Technology Corporation, Iwaki-shi (JP)

( * ) Notice: Subject to any disclaimer, the term of this patent is extended or adjusted under 35 U.S.C. 154(b) by 588 days.

(21) Appl. No.: 13/415,065

(22) Filed: Mar. 8, 2012

(65) Prior Publication Data

US 2013/0107124 A1 May 2, 2013

(30) Foreign Application Priority Data

Oct. 27, 2011 (JP) .................................. 2011-236036
Feb. 24, 2012 (JP) .................................. 2012-038502

(51) Int. Cl.
*H04N 5/14* (2006.01)
*G06T 7/20* (2006.01)

(52) U.S. Cl.
CPC .............. *G06T 7/2066* (2013.01); *H04N 5/145* (2013.01); *G06T 2207/20021* (2013.01); *G06T 2207/20076* (2013.01)

(58) Field of Classification Search
CPC .................. H04N 5/145; G06T 7/2066; G06T 2207/20021; G06T 2207/20076
USPC ...................................... 375/240.16; 348/699
See application file for complete search history.

(56) References Cited

U.S. PATENT DOCUMENTS

| | | | | |
|---|---|---|---|---|
| 5,867,593 | A | * | 2/1999 | Fukuda et al. ................ 382/176 |
| 5,929,913 | A | * | 7/1999 | Etoh ........................ 375/240.11 |
| 2011/0206282 | A1 | * | 8/2011 | Aisaka et al. ................. 382/195 |

FOREIGN PATENT DOCUMENTS

| | | |
|---|---|---|
| JP | 10-51788 | 2/1998 |
| JP | 2000-76449 | 3/2000 |

* cited by examiner

*Primary Examiner* — Christopher S Kelley
*Assistant Examiner* — Matthew Kwan
(74) *Attorney, Agent, or Firm* — Oblon, McClelland, Maier & Neustadt, L.L.P.

(57) ABSTRACT

A motion vector computing device according to one embodiment includes: a difference computing unit that computes inter-frame temporal difference value It, uses horizontal direction inter-pixel difference value Ix and vertical direction inter-pixel difference value Iy in a same frame, the current frame signal and the different frame signals when the pixel moves for a small-time, a variance matrix generating unit computes the variances of the gradient in the horizontal direction, in the vertical direction and in the temporal direction of the luminance value on the basis of the difference values Ix, Iy and It, a coefficient computing unit computes a coefficient of a flat plane formula by calculating a formula for giving a minimum with regard to the square error of the flat plane formula approximating the distribution of luminance gradients of the pixel and a vector computing unit computes the motion vector uses the coefficient.

14 Claims, 4 Drawing Sheets

FIG. 6

MOTION VECTOR COMPUTING DEVICE AND MOTION VECTOR COMPUTING METHOD

CROSS REFERENCE TO RELATED APPLICATIONS

This application is based upon and claims the benefit of priority from the prior Japanese Patent Application No. 2011-236036 filed on Oct. 27, 2011 and No. 2012-38502 filed on Feb. 24, 2012, the entire contents of which are incorporated herein by reference.

FIELD

Embodiments described herein relate generally to a motion vector computing device and a motion vector computing method.

BACKGROUND

Compressing video data by means of compression coding techniques is being widely practiced. Compression coding techniques include those of comparing two frames and computing a motion vector between those frames as in the case of MPEG-1 and MPEG-2. Known techniques of computing a motion vector include block matching methods of observing matching of pixel blocks in one of the frames and corresponding pixel blocks in the other frame and computing a motion vector on the basis of the degree of matching. However, block matching methods entails a vast amount of computation and cannot get decimal point accuracy of a sub-pixel level.

The Lucas-Kanade method is known as a technique of getting decimal point accuracy of a sub-pixel level with a reduced amount of computation. With this method, a motion vector is computed from a distribution of luminance gradient vectors and hence is classified as a gradient method. However, it provides only a narrow scope of search and cannot correctly compute a motion vector in the case of a move that involves several pixels.

Eigenvector methods are known as methods capable of estimating a motion vector for an image showing a large move and getting decimal point accuracy of a sub-pixel level. Eigenvector methods are also classified as gradient methods. With an eigenvector method, an eigenvector of 3×3 variance-covariance matrix is determined from a distribution of luminance gradient vectors to compute a motion vector. However, these methods also entail a vast amount of computation.

Eigenvalues needs to be highly accurately computed in order to computationally determine a motion vector of higher precision but all the above-described techniques have inherent drawbacks. Therefore, there is a demand for computation techniques that can satisfy the requirement of a large scope of search, that of a reduced amount of computation and that of decimal point accuracy of a sub-pixel level at a time.

There is also a demand for techniques showing a small image dependency for reliability evaluation of an estimated motion vector.

DETAILED DESCRIPTION

According to one embodiment, there is provided a device for computing a motion vector by means of a gradient method, including: a block setting unit for dividing an input moving image signal into specified block regions; a memory for storing different frame signals, a difference computing unit for computing inter-frame temporal difference value It, using horizontal direction inter-pixel difference value Ix and vertical direction inter-pixel difference value Iy in a same frame, the current frame signal and the different frame signals stored in the memory when the pixel expressed by coordinates (x, y, t) moves for a small-time in the image of the block regions produced as a result of the division by the block setting unit, x being the coordinate value in the horizontal direction, y being the coordinate value in the vertical direction, t being the coordinate value in the temporal direction; a variance matrix generating unit for computing the variance of the gradient in the horizontal direction, the variance of the gradient in the vertical direction and the variance of the gradient in the temporal direction of the luminance value according to the move of the pixel in the small-time on the basis of the difference values Ix, Iy and It; a coefficient computing unit for computing a coefficient of a flat plane formula by calculation using a formula for giving a minimum with regard to the square error of the flat plane formula approximating the distribution of luminance gradients of the pixel; and a vector computing unit for computing the motion vector using the coefficient computed by the coefficient computing unit.

Now, embodiments of the present invention will be described below by referring to the accompanying drawings. Throughout the drawings, the same parts are denoted by the same reference symbols and will not be described repeatedly.
(First Embodiment)

The first embodiment of motion vector computing device estimates a motion vector by means of a so-called gradient method. A gradient method is for estimating parameters of a motion of an object from a moving image by means of time-space differential. It leads out a relational expression of time-space differential and optical flow on an assumption of "the brightness of a point on an object does not change after a move" and estimates the motion of the object by utilizing the assumption.

Figure 1:
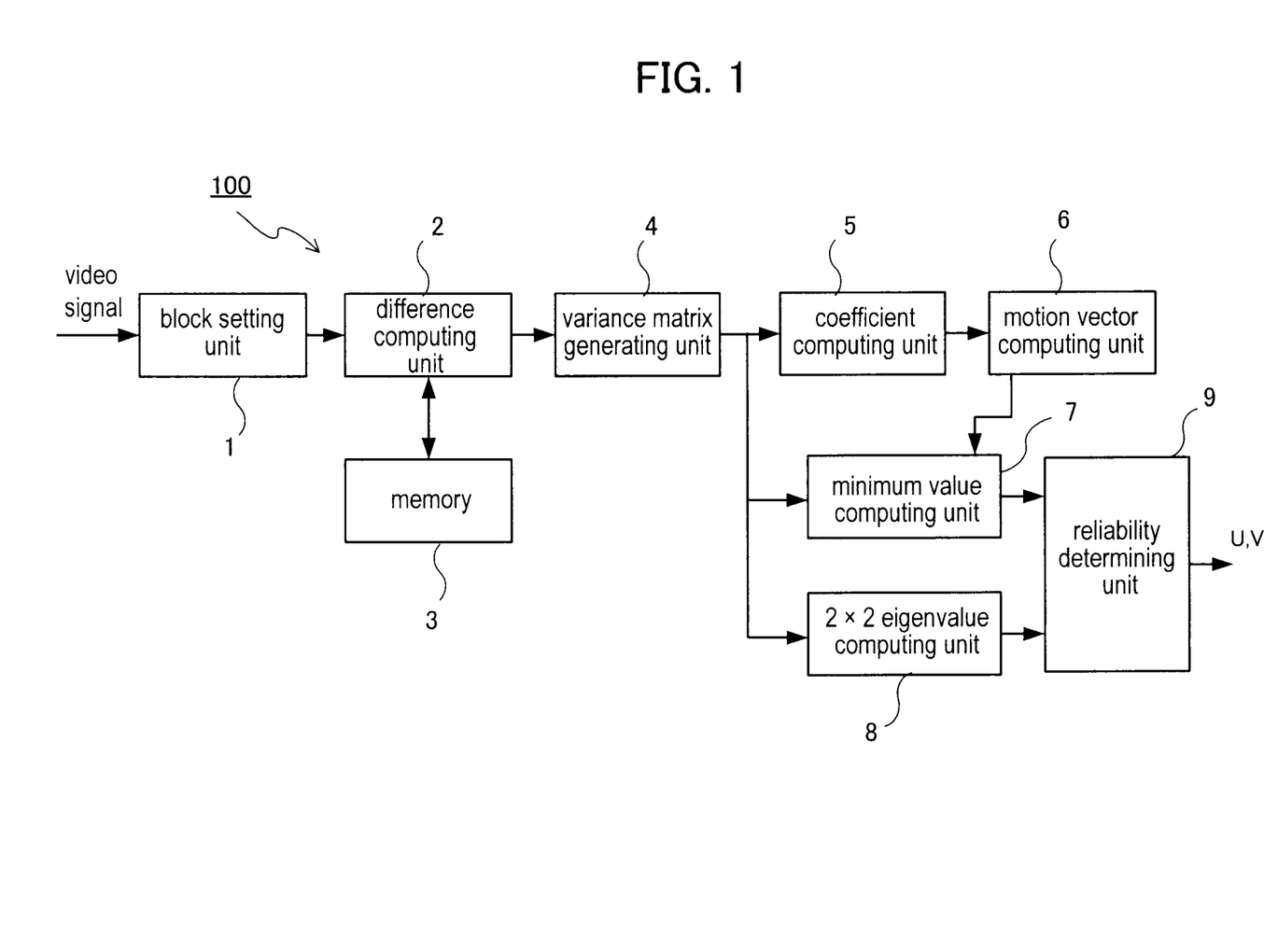
FIG. 1 is a block diagram of first embodiment of motion vector computing device according to the present invention, showing a configuration example thereof.

FIG. 1 is a block diagram of first embodiment of motion vector computing device according to the present invention, showing a configuration example thereof. As shown in FIG. 1, the motion vector computing device has as major components a block setting unit 1, a difference computing unit 2, a memory 3, a variance matrix generating unit 4, a coefficient computing unit 5, a motion vector computing unit 6, a minimum value computing unit 7, a 2×2 eigenvalue computing unit 8 and a reliability determining unit 9.

Note that this device can be realized as hardware, as software or a combination of hardware and software. More specifically, the device includes arithmetic units such as CPU, a main memory, buses, memory devices such as a hard disk and a nonvolatile memory, memory mediums, reading drives for the memory mediums, ports for various communications and transmission/reception, hardware forming units including peripherals, driver programs for controlling the pieces of hardware and other application programs and interfaces to be utilized to acquire information as input. These pieces of hardware and software are utilized to sequentially arithmetically process the programs developed on the memories by means of arithmetic units, to process, accumulate and output the data input by way of the interfaces and to control the hardware forming units.

The block setting unit 1 receives image signals of a moving image as input and divides the input image signal into images of the specified block regions. The block setting unit 1 extracts image blocks at specified position (x, y) and having size of M×N pixels. The image blocks are those at different clock times t, t+$t_1$, t+$t_2$, . . . . The image block position (horizontal x, vertical y) is specified according to block position information. The image block size M, N is expressed by the number of pixels in the longitudinal direction and the number of pixels in the transversal direction that are specified in advance.

The memory 3 stores the signal of a different frame. The different frame signal may be the signal of the immediately preceding frame.

The difference computing unit 2 computes the horizontal direction inter-pixel difference value Ix, the vertical direction inter-pixel difference value Iy in a same frame and the inter-frame (temporal) difference value It in the image of the block regions divided by the block setting unit 1. The difference value It is obtained by a difference calculation using the current frame signal and the different frame signal stored in the memory.

The variance matrix generating unit 4 computes the variance of the gradient in the horizontal direction, the variance of the gradient in the vertical direction and the variance of the gradient in the temporal direction of the luminance value in a moving image when the pixel expressed by coordinates (x, y, t) moves for a small-time in the image, where x is the coordinate value in the horizontal direction, y is the coordinate value in the vertical direction and t is the coordinate value in the temporal direction. More specifically, it computes 3×3 luminance gradient variance-covariance matrix A.

The coefficient computing unit 5 computes a coefficient of a flat plane formula by calculation using a formula for giving a minimum with regard to the square error of the flat plane formula approximating the distribution of luminance gradients.

The motion vector computing unit 6 computationally determines motion vector (u, v), using the coefficient determined by the coefficient computing unit 5.

The minimum value computing unit 7 computes minimum value Emin, which will be described hereinafter, using the elements of the variance-covariance matrix A computed by the variance matrix generating unit 4 and the motion vector (u, v) computationally determined by the motion vector computing unit 6.

The 2×2 eigenvalue computing unit 8 transforms the variance-covariance matrix A into a 2×2 matrix, using difference value It=0 for the elements of the variance-covariance matrix A to determine eigenvalues $\lambda 1$, $\lambda 2$, which will be described hereinafter.

The reliability determining unit 9 outputs the motion vector (u, v) when the minimum value Emin is not greater than a set threshold value and the eigenvalues $\lambda 1$, $\lambda 2$ are not smaller than a set threshold value. A transfer vector is a vector obtained by three-dimensionally expanding the motion vector (u, v).

Figure 2:
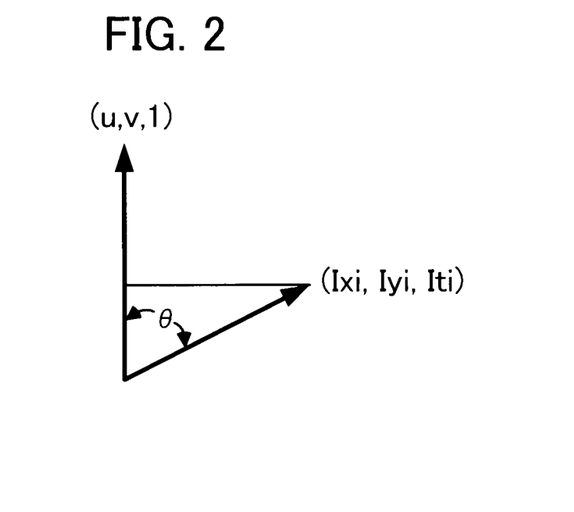
FIG. 2 is a schematic illustration of angle 9 formed by each luminance gradient vector in an image block and the transfer vector of the same image block.

FIG. 2 is a schematic illustration of angle θ formed by each luminance gradient vector in an image block and the transfer vector of the same image block.

Note that the luminance gradient vectors of each pixel in an image block having a number of pixels equal to N×M are expressed by gi=(Ix, Iy, It)$^t$ [where Ix is the luminance gradient component in the x (horizontal) direction, Iy is the luminance gradient component in the y (vertical) direction and It is the luminance gradient component in the t (temporal) direction] and the transfer vector in the image block is expressed by w=(u, v, 1)$^t$.

As expressed by formula (9a), which will be described hereinafter, the luminance gradient vectors gi and the transfer vector w=(u, v, 1)$^t$ are orthogonal (θ=π/2) relative to each other.

However, there does not exist any vector that is completely orthogonal relative to the luminance gradient vectors gi of each pixel in the image block. The Lucas-Kanade method determines the transfer vector that makes least squares applicable to the discrepancy from being orthogonal relative to the luminance gradient vectors gi of each pixel in the image block is determined.

Figure 3:
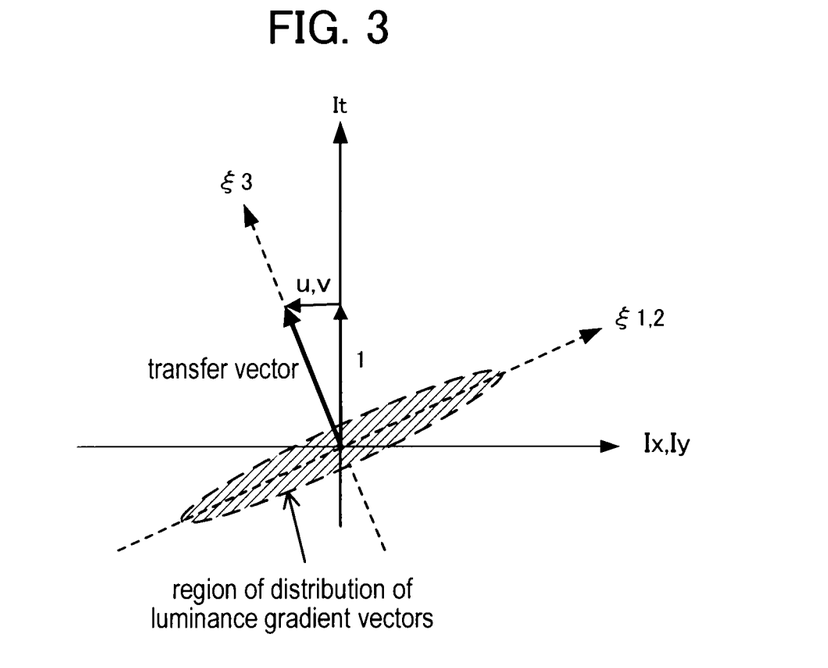
FIG. 3 is a schematic illustration of the concept of distribution of luminance gradient vectors.

FIG. 3 is a schematic illustration of the concept of distribution of luminance gradient vectors gi=(Ix, It, It)$^t$. In FIG. 3, the horizontal axis indicates the horizontal and vertical, horizontal or vertical components of luminance gradient vector, whereas the vertical axis indicates the temporal components of luminance gradient vector. If the distribution can be approximated by a plane by means of least squares approximation, motion vector (u, v) can be determined by making the vector that is orthogonal relative to the plane transfer vector (u, v, 1).

The eigenvector method is a technique of determining the least squares approximation plane. Assume that the eigenvalues of the luminance gradient variance-covariance matrix A are $\lambda 1$, $\lambda 2$, $\lambda 3$ in the descending order of magnitudes and the eigenvectors that correspond to the eigenvalues are $\xi 1$, $\xi 2$, $\xi 3$. The plane expressed by the eigenvectors $\xi 1$, $\xi 2$ is the least squares approximation plane of the distribution of luminance gradient vectors. $\xi 3$ can be used as eigenvector that is orthogonal to the plane.

Now, the arithmetic processing operations of the motion vector computing device having the above-described configuration will be described in detail below.

(Approximation Plane of Luminance Gradient Vectors)

Assuming that luminance gradient vectors (Ix, Iy, It)$^t$ show a distribution and the plane approximating the distribution is expressed by formula (1) shown below.

$$\alpha Ix + \beta Iy + \gamma It = \delta \quad (1)$$

(1) The normal vector of the plane expressed by the formula (1) is $(\alpha, \beta, \gamma)^t$.

(Definition of Evaluation Function)

Now, evaluation function E is defined below.

Σ represents the sum of (Ix, Iy, It)$^t$ of all the pixels in a block region.

$$E = \Sigma \delta^2 = \Sigma(\alpha Ix + \beta Iy + \gamma It)^2 \quad (2)$$

The least squares approximation plane of the distribution can be determined by determining the plane that minimizes the evaluation function E.

To obtain the minimum of the evaluation function E, partial derivatives are determined for it by means of α, β, γ and made to be equal to 0.

$$(\tfrac{1}{2}) \partial E / \partial \alpha = \alpha \Sigma Ix^2 + \beta \Sigma IxIy + \gamma \Sigma IxIt = 0 \quad (3)$$

$$(\tfrac{1}{2}) \partial E / \partial \beta = \alpha \Sigma IxIy + \beta \Sigma Iy^2 + \gamma \Sigma IyIt = 0 \quad (4)$$

$$(\tfrac{1}{2}) \partial E / \partial \gamma = \alpha \Sigma IxIt + \beta \Sigma IyIt + \gamma \Sigma It^2 = 0 \quad (5)$$

(Luminance Gradient Variance-Covariance Matrix of Block)

The coefficients of the formulas (3), (4) and (5) can be expressed as the elements of variance-covariance matrix A.

$$A = \Sigma(Ix, Iy, It)^t(Ix, Iy, It) = \begin{pmatrix} a11 & a12 & a13 \\ a21 & a22 & a23 \\ a31 & a32 & a33 \end{pmatrix} \quad (6)$$

where $$a11 = \Sigma Ix^2 \quad (7a)$$

$$a22 = \Sigma Iy^2 \quad (7b)$$

$$a33 = \Sigma It^2 \quad (7c)$$

$$a12 = a21 = \Sigma IxIy \quad (7d)$$

$$a13 = a31 = \Sigma IxIt \quad (7e)$$

$$a23 = a32 = \Sigma IyIt \quad (7f)$$

The formulas (3), (4) and (5) can be rewritten as follows by using the elements.

$$a11\alpha + a12\beta + a13\gamma = 0 \quad (3a)$$

$$a21\alpha + a22\beta + a23\gamma = 0 \quad (4a)$$

$$a31\alpha + a32\beta + a33\gamma = 0 \quad (5a)$$

The following formulas are obtained by dividing each of the formulas (3a), (4a) and (5a) by $\gamma$.

$$a11\alpha/\gamma + a12\beta/\gamma + a13 = 0 \quad (8a)$$

$$a21\alpha/\gamma + a22\beta/\gamma + a23 = 0 \quad (8b)$$

$$a31\alpha/\gamma + a32\beta/\gamma + a33 = 0 \quad (8c)$$

(Basic Restriction Formula of Motion Vector)

As is well known, the basic restriction formula of motion vector m (u, v) determined by a gradient method can be obtained as shown below from the condition that the luminance in an image does not change in a small-time:

$$Ixu + Iyv + It = 0 \quad (9)$$

where u is the x component of the motion vector m and v is the y component of the motion vector m. Additionally, the transfer vector for three-dimensionally expanding the motion vector m (u, v) is defined as $w = (u, v, 1)^t$. The basic restriction formula (9) is expressed by the formula shown below, using luminance gradient vectors $gi = (Ix, Iy, It)^t$ and transfer vector $w = (u, v, 1)^t$.

$$(Ix, Iy, It)(u, v, 1)^t = 0 \quad (9a)$$

The following equations are obtained by assuming that the transfer vector w (u, v, 1)$^t$ of the basic restriction formula and the normal vector $(\alpha, \beta, \gamma)^t$ for plane of the formula (1) are in the same direction.

$$u = \alpha/\gamma \quad (10a)$$

$$v = \beta/\gamma \quad (10b)$$

The following formulas are obtained by applying the formulas (10a) and (10b) to the formulas (8a), (8b) and (8c).

$$a11u + a12v + a13 = 0 \quad (11a)$$

$$a21u + a22v + a23 = 0 \quad (11b)$$

$$a31u + a32v + a33 = 0 \quad (11c)$$

$$\begin{pmatrix} a11 & a12 \\ a21 & a22 \\ a31 & a32 \end{pmatrix} \begin{pmatrix} u \\ v \end{pmatrix} - \begin{pmatrix} -a13 \\ -a23 \\ -a33 \end{pmatrix}$$

(Computation of Coefficients)

The known Lucas-Kanade method is for getting the solution for the formula (11a) and also the solution for the formula (11b) but it does not take the formula (11c) into consideration. In other words, the Lucas-Kanade method employs $a13 = a31 = \Sigma IxIt$ and $a23 = a32 = \Sigma IyIt$ but does not employ $a33 = \Sigma It^2$. When It is small, it overlaps Ix, Iy, however, as It gets greater, there arises a region where it does not overlap Ix and Iy. Then, the part of It that does not overlap is not reflected to the solutions. For this reason, in the case of a large motion, the computed motion vector is subject to a ceiling of fixed value in the Lucas-Kanada method.

The above three equations end up with a simultaneous system of linear equations with two unknowns. Thus, the points of intersection of the formulas (11a), (11b) and (11c) are determined by the method of least squares.

The normal equation as shown below is prepared.

$$\begin{pmatrix} a11 & a21 & a31 \\ a12 & a22 & a32 \end{pmatrix} \begin{pmatrix} a11 & a12 \\ a21 & a22 \\ a31 & a32 \end{pmatrix} \begin{pmatrix} u \\ v \end{pmatrix} = \begin{pmatrix} a11 & a21 & a31 \\ a12 & a22 & a32 \end{pmatrix} \begin{pmatrix} -a13 \\ -a23 \\ -a33 \end{pmatrix} \quad (12)$$

Assume that $$b11 = a11^2 + a21^2 + a31^2 = (\Sigma Ix^2)^2 + (\Sigma IxIy)^2 + (\Sigma IxIt)^2 \quad (13a)$$

$$b12 = b21 = a11a12 + a21a22 + a31a32 \quad (13b)$$
$$= (\Sigma Ix^2 + \Sigma Iy^2)\Sigma IxIy + \Sigma IxIt\Sigma IyIt$$

$$b22 = a12^2 + a22^2 + a32^2 = (\Sigma Iy^2)^2 + (\Sigma IxIy)^2 + (\Sigma IyIt)^2 \quad (13c)$$

$$c1 = a11a13 + a21a23 + a31a33 \quad (13d)$$
$$= \Sigma Ix^2 \Sigma IxIt + \Sigma IxIy \Sigma IyIt + \Sigma IxIt \Sigma It^2$$
$$= (\Sigma Ix^2 + \Sigma It^2)\Sigma IxIt + \Sigma IxIy \Sigma IyIt$$

$$c2 = a12a13 + a22a23 + a32a33 \quad (13e)$$
$$= \Sigma IxIy \Sigma IxIt + \Sigma Iy^2 \Sigma IyIt + \Sigma IyIt \Sigma It^2$$
$$= (\Sigma Iy^2 + \Sigma It^2)\Sigma IyIt + \Sigma IxIy \Sigma IxIt$$

then, the formula (12) is paraphrased by the formula shown below.

$$\begin{pmatrix} b11 & b12 \\ b21 & b22 \end{pmatrix} \begin{pmatrix} u \\ v \end{pmatrix} = \begin{pmatrix} -c1 \\ -c2 \end{pmatrix} \quad (14)$$

(Computation of Motion Vector)

The motion vector (u, v) is determined by the formulas shown below.

$$u = (b12c2 - b22c1)/(b11b22 - b12^2) \quad (15a)$$

$$v = (b12c1 - b11c2)/(b11b22 - b12^2) \quad (15b)$$

As described above, the motion vector (u, v) is "uniquely" computed from the formulas (13a) through (13e), (15a) and (15b) by means of product-sum operations and divisions and hence no repetitive operations are necessary.

Additionally, when the normal vector $(\alpha, \beta, \gamma)^t$ is employed as unit vector, $$\alpha^2 + \beta^2 + \gamma^2 = 1$$

and hence the following equation is obtained by modifying the evaluation function E of the formula (2).

$$\begin{aligned} E = \Sigma\delta^2 &= (1/\Upsilon^2)\{\Sigma(\alpha/\Upsilon)Ix + (\beta/\Upsilon)Iy + It\}^2 \\ &= \{1/(u^2 + v^2 + 1)\}\Sigma(Ixu + Iyv + It)^2 \\ &= \{1/(u^2 + v^2 + 1)\}(a11u^2 + a22v^2 + a33 + \\ &\quad 2a12uv + 2a13u + 2a23v) \end{aligned} \quad (2a)$$

(Computation of Minimum Value of Evaluation Function)

Minimum value Emin of the evaluation function E can be obtained by substituting u, v determined by means of the formulas (15a) and (15b) in the formula (2a).

$$\begin{aligned} Emin = E\delta^2 &= \{1/(u^2 + v^2 + 1)\}\Sigma(Ixu + Iyv + It)^2 \\ &= \{1/(u^2 + v^2 + 1)\}(a11u^2 + a22v^2 + a33 + \\ &\quad 2a12uv + 2a13u + 2a23v) \end{aligned} \quad (16)$$

(Determination of Reliability of Motion Vector (u, v))

The minimum value Emin given by the formula (16) represents the square of the error in the direction of the normal vector so that the approximation by the plane expressed by the formula (1) can be determined to be excellent when the minimum value Emin is small. The minimum value Emin is then employed to evaluate the reliability of the motion vector (u, v).

In this embodiment, the reliability of the motion vector (u, v) computed by means of the formulas (15a) and (15b) is determined under the determination conditions 1, 2 shown below.

1. When the minimum value Emin of the formula (16) is not greater than a threshold value, it signifies that the approximation of the luminance gradient vector in the block by a plane is excellent and the motions of the pixels in the block are concerted. Therefore, the reliability is determined to be acceptable. Emin/(Emin+λ1+λ2) obtained by normalizing the minimum value Emin by λ1, λ2, which will be described hereinafter, may be utilized for the determination with the threshold value.

2. When the eigenvalues of the luminance gradient vectors of 2×2 obtained by using It=0 in the formula (6) are λ1, λ2 and if λ1, λ2 are not less than a threshold value, it can be so determined that luminance gradient vectors Ix, Iy exist with a sufficient magnitude in the block and the luminance gradient vectors are distributed in two directions of the horizontal direction and the vertical direction (corner edge).

(Computation of Eigenvalues of 2×2 Matrix)

The minimum value Emin can be smaller than the threshold value even when the luminance gradient vectors are very small when only the determination condition 1 is used. Then, it will be difficult to determine the right motion vector because of influence of noise. Additionally, as is known as window problem, when the luminance gradient vectors are distributed in one direction (linear edge), the motion vector (u, v) cannot be determined uniquely. In such an instance, however, the motion vector can be determined by means of the eigenvalues λ1, λ2 shown in the determination condition 2.

The computation of the eigenvalues of a 2×2 matrix is reduced to a quadratic equation and hence does not involve a large volume of operation. Additionally, the eigenvalues λ1, λ2 are not required to be very accurate when they are used for the determination condition 2. Then, the operation of computing the eigenvalues can be simplified as shown below to determine pseudo-eigenvalues λ'1, λ'2.

If a difference value of It=0 is used in the temporal direction in the formula (6):

$$\begin{pmatrix} \Sigma Ix^2 & \Sigma Ixly \\ \Sigma Ixly & \Sigma Iy^2 \end{pmatrix} = \begin{pmatrix} a11 & b12 \\ a21 & a22 \end{pmatrix} \quad (17)$$

Then, pseudo-eigenvalues λ'1, λ'2 can be determined by solving the eigenequation.

$$\begin{vmatrix} a11 - \lambda & a12 \\ a21 & a22 - \lambda \end{vmatrix} = 0 \quad (18)$$

While λ'1, λ'2 slightly differ from the respective eigenvalues λ1, λ2 that are three-dimensionally defined when rigorously observed, they represent the distribution of edge components of luminance gradient vectors and can practically be utilized to evaluate the reliability of motion vector.

Thus, with the first embodiment, a motion vector can be accurately obtained for a large motion by estimation by means of unique product-sum operations and divisions. Additionally, the reliability of the estimated motion vector can be determined with least image dependency and it is possible to determine if there is a corner edge in a block that can suitably be used for estimation of a motion vector.

(Second Embodiment)

Now, the second embodiment of the present invention will be described below.

Figure 4:
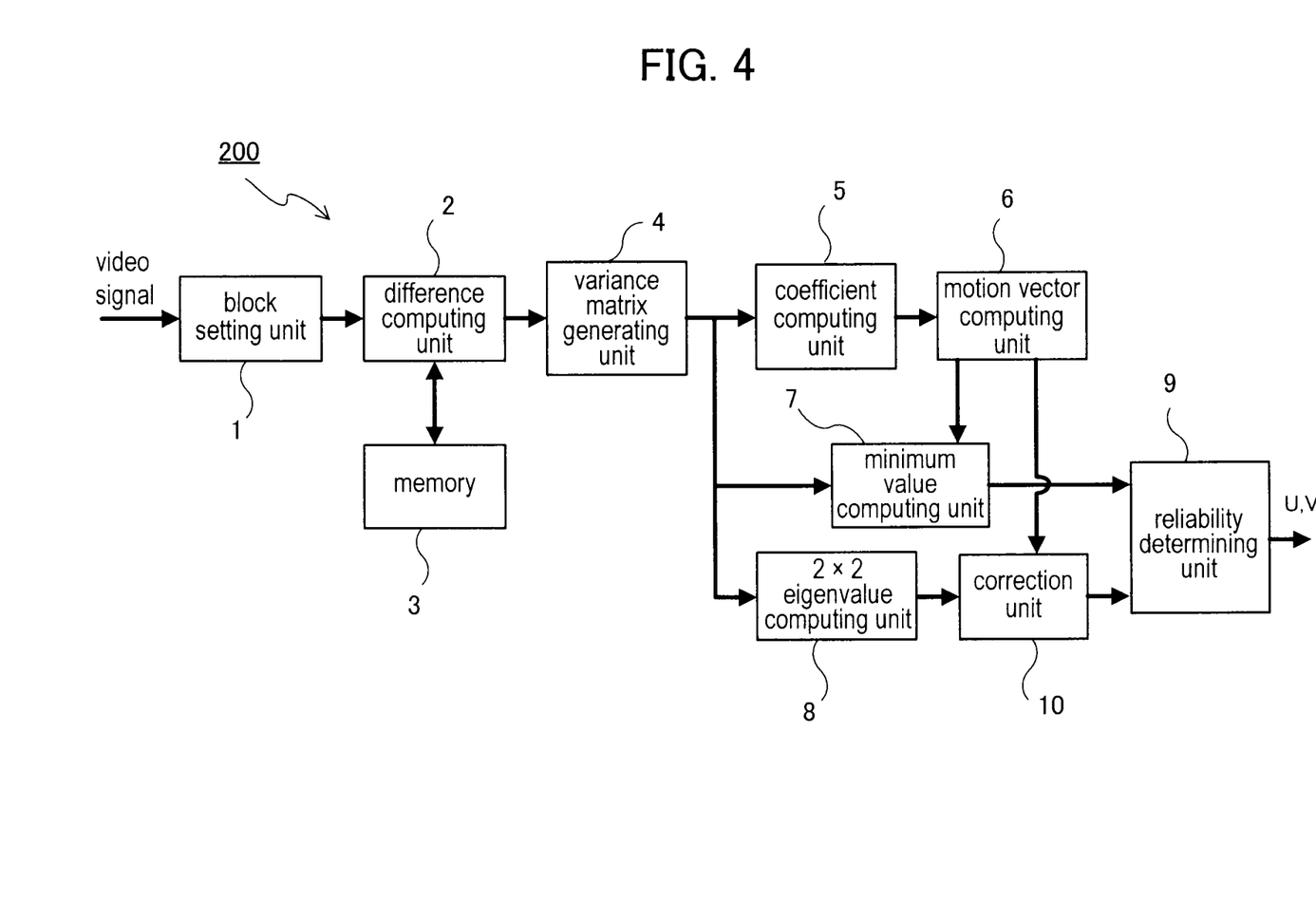
FIG. 4 is a block diagram of the second embodiment of motion vector computing device according to the present invention, showing a configuration example thereof.

FIG. 4 is a block diagram of the motion vector computing device 200 of the second embodiment according to the present invention, showing a configuration example thereof. The second embodiment has a correction unit 10 in addition to the components of the motion vector computing device of the first embodiment.

The correction unit 10 is for correcting the eigenvalues λ'1, λ'2 computed by the 2×2 eigenvalue computing unit 8. The correction unit 10 receives the pseudo-eigenvalues λ'1, λ'2 from the 2×2 eigenvalue computing unit 8 and also receives the motion vector (u, v) from the motion vector computing unit 6 to compute 3×3 eigenvalues λ31, λ32.

Figure 5:
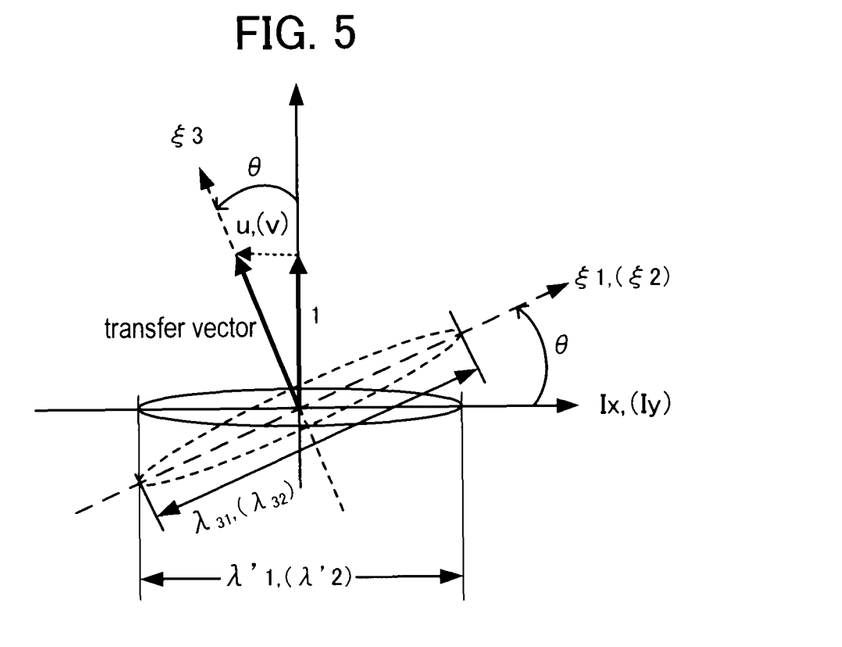
FIG. 5 is a schematic illustration for explaining 3×3 eigenvalues and 2×2 eigenvalues.
Figure 6:
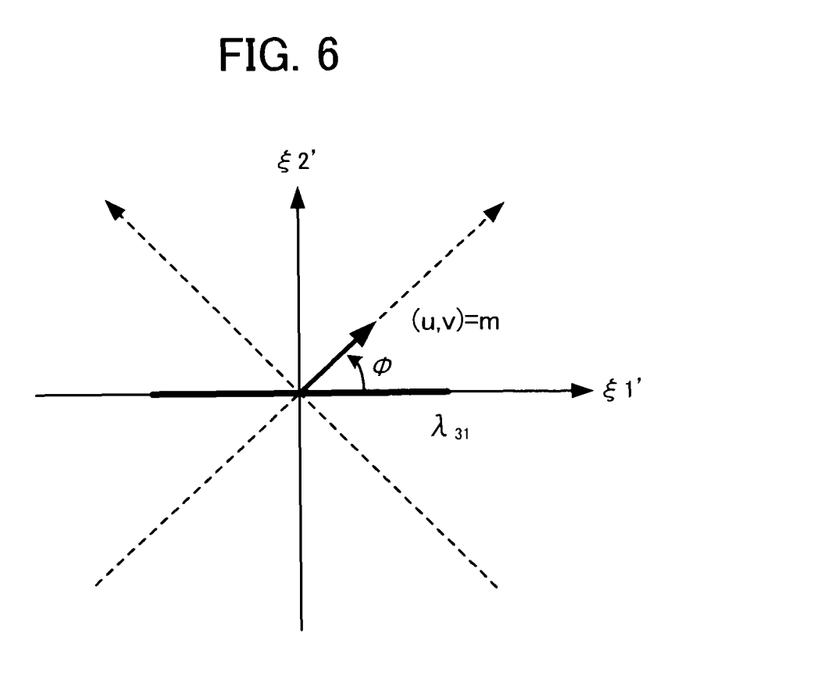
FIG. 6 is a schematic illustration for explaining eigenvectors $\xi 1'$ and $\xi 2'$ shown in FIG. 5 on a plane.

Now, the correcting operation will be described in detail by referring to FIGS. 5 and 6. FIG. 5 is a schematic illustration for explaining 3×3 eigenvalues and 2×2 eigenvalues.

Referring to FIG. 5, the eigenvalues of 3×3 luminance gradient covariance matrix A are expressed as λ31, λ32, λ33 in the descending order of magnitudes, and consider three-dimensional eigenvectors ξ1, ξ2, ξ3 that correspond to these eigenvalues.

It=0 when an image does not move and hence the plane of the eigenvectors ξ1, ξ2 agree with the plane of Ix, Iy, while the axis of the eigenvector ξ3 agrees with the It axis. When an image moves, the θ axis and the It axis give rise to inclination e as shown in FIG. 5 and, at the same time, the plane of the eigenvectors ξ1, ξ2 and the plane of Ix, Iy give rise to inclination θ. The axis of rotation is referred to as β axis and the axis orthogonal to the β axis is referred to as α axis.

When an image moves, It≠0 and the ξ coordinate system rotate by θ around the β axis that operates as axis of rotation. Then, the transfer vector is (u, v, 1). The coordinates of the eigenvectors ξ1, ξ2 projected on the plane Ix, Iy are referred to as ξ1', ξ2' respectively. FIG. 6 is a schematic illustration for explaining eigenvectors ξ1' and ξ2' shown in FIG. 5 on a plane. If the angle formed by the motion vector m (u, v) and the eigenvector ξ1' is ø, the formula shown below can be obtained.

$$\cos ø = m^t \cdot \xi 1'/(|m||\xi 1'|) \tag{19}$$

From the above, if the 2×2 eigenvalues are λ'1, λ'2 and the eigenvector that corresponds to λ'1 is ξ'1, 3×3 eigenvalues λ31, λ32 can be expressed as follows.

$$\lambda 31 = \sqrt{(1+|m|^2 \cos^2 ø)} \lambda'1 \tag{20}$$

$$\lambda 32 = \sqrt{\{1+|m|^2 \cos^2 ø\}} \lambda'2 \tag{21}$$

The formula shown below is obtained by transforming the formula (19).

$$\cos^2 ø = (m^t \cdot \xi'1)^2/(|m|^2|\xi'1|^2) \tag{22}$$

$$m = (u,v)^t, |m|^2 = u^2 + v^2 \tag{}$$

If an image moves, the eigenvalue λ1 that is the variance on eigenvector ξ1 is decomposed into a direction $\lambda_{1\alpha}$ and β direction $\lambda_{1\beta}$, assuming that angle ø is constant.

$$\lambda_{1\alpha} = \lambda 1 \cos ø \tag{23}$$

$$\lambda_{1\beta} = \lambda 1 \sin ø \tag{24}$$

Assuming $\lambda_{1\alpha}$, $\lambda_{1\beta}$ as Ix, Iy, $\lambda_{1\alpha}$, $\lambda_{1\beta}$ projected on the Ix, Iy plane are expressed as $\lambda'_{1\alpha}$, $\lambda'_{1\beta}$ respectively. Then, $$\lambda_{1\alpha} \cos θ = \lambda'_{1\alpha} \tag{25}$$

$$\lambda_{1\beta} = \lambda'_{1\beta} \tag{26}$$

Note, however, that the following equations are obtained for λ' on the Ix, Iy plane.

$$\lambda_{1\alpha} = \lambda'_1 \cos ø \tag{27}$$

$$\lambda_{1\beta} = \lambda'_1 \sin ø \tag{28}$$

If the angle θ is expressed by means of the motion vector m, $$\cos θ = 1/\sqrt{(1+|m|^2)} \tag{29}$$

From the above, $$1/\cos θ = \sqrt{(1+|m|^2)} \tag{30}$$

and hence the formulas (25) and (26) can be transformed as below.

$$\lambda_{1\alpha} = \sqrt{(1+|m|^2)} \lambda'_{1\alpha} \tag{31}$$

$$\lambda_{1\beta} = \lambda'_{1\beta} \tag{32}$$

Therefore, $$\lambda 1^2 = \lambda_{1\alpha}^2 + \lambda_{1\beta}^2 \tag{33}$$
$$= (1+|m|^2)\lambda'^2_{1\alpha} + \lambda'^2_{1\alpha}$$
$$= (1+|m|^2)\lambda'^2_1 \cos^2 ø + \lambda'^2_1 \sin^2 ø$$

$$\lambda 1^2 = (1+|m|^2 \cos^2 ø)\lambda'^2_1 \tag{34}$$
$$\lambda 1 = \sqrt{(1+|m|^2 \cos^2 ø)} \lambda'_1$$

As similar operations are conducted for λ2, the following equations are obtained:

$$\lambda 2^2 = \lambda_{2\alpha}^2 + \lambda_{2\beta}^2 \tag{35}$$
$$= (1+|m|^2 \sin^2 ø)\lambda'^2_2$$
$$= \{1+|m|^2 (1-\cos^2 ø)\}\lambda'^2_2$$
$$\lambda 2 = \sqrt{\{1+|m|^2(1-\cos^2 ø)\}\lambda'^2_2}$$

where $$\cos^2 ø = (m^t \cdot \xi'1)^2/(|m|^2|\xi'1|^2) \tag{36}$$
$$m = (u, v)^t, |m|^2 = u^2 + v^2$$

Thus, the eigenvalues λ'1, λ'2 and the eigenvector ξ'1 can be obtained as eigenvalues and eigenvector ξ'1 of the covariance matrix of 2×2 luminance gradient vectors for which It=0 is assumed. In other words, the eigenvalues λ'1, λ'2 and the eigenvector ξ'1 are obtained from the covariance matrix of 2×2 luminance gradient vectors shown as formula (37) below.

$$\begin{pmatrix} \Sigma Ix^2 & \Sigma IxIy \\ \Sigma IxIy & \Sigma Iy^2 \end{pmatrix} \tag{37}$$

The computation of the eigenvalues is reduced to determining the solution of a quadratic equation and the computation of the eigenvector is reduced to determining the solution of a simultaneous system of linear equations with two unknowns. Additionally, motion vector m=(u, v)$^t$ is obtained separately.

With the above, the eigenvalues λ31, λ32 can be determined from λ'1, λ'2, ξ'1, u and v, using the formulas (34) through (36).

While eigenvector ξ1' is employed above for the definition of ø in the above explanation, it is evident that eigenvector ξ2' can also be used for a similar explanation. Then, it is simply necessary to replace ø with π/2−ø when eigenvector ξ2' is employed.

Thus, the second embodiment can improve the accuracy of computing a motion vector by estimating the angle of a move from the motion vector and correcting the eigenvalues λ'1, λ'2 determined by means of a quadratic equation.

While certain embodiments have been described, these embodiments have been presented by way of example only, and are not intended to limit the scope of the inventions. Indeed, the novel methods and systems described herein may be embodied in a variety of the other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A device for computing a motion vector by means of a gradient method, comprising:
   a block setting unit that divides an input moving image signal into specified block regions;
   a memory that stores different frame signals;
   a difference computing unit that computes inter-frame temporal difference value It, uses horizontal direction inter-pixel difference value Ix and vertical direction inter-pixel difference value Iy in a same frame, the current frame signal and the different frame signals stored in the memory when the pixel expressed by coordinates (x, y, t) moves for a small-time in the image of the block regions produced as a result of the division by the block setting unit, x is the coordinate value in the horizontal direction, y is the coordinate value in the vertical direction, t is the coordinate value in the temporal direction;

a variance matrix generating unit that computes the variance of the gradient in the horizontal direction, the variance of the gradient in the vertical direction and the variance of the gradient in the temporal direction of a luminance value according to the move of the pixel in the small-time on the basis of the difference values Ix, Iy and It;

a coefficient computing unit that computes a coefficient of a flat plane formula by calculation using a formula for giving a minimum with regard to the square error of the flat plane formula approximating the distribution of luminance gradients of the pixel; and a motion vector computing unit that computes the motion vector using the coefficient computed by the coefficient computing unit, wherein the variance matrix generating unit defines evaluation function E as $E=\Sigma\delta^2=\Sigma(\alpha Ix+\beta Iy+\gamma It)^2$, assuming that the luminance gradient vectors $(Ix, Iy, It)^t$ of all the pixels in the block regions are distributed on a two-dimensional plane expressed by $\alpha Ix+\beta Iy+\gamma It=\delta$, using normal vector $(\alpha, \beta, \gamma)^t$ of the plane.

2. The device according to claim 1, wherein the block setting unit extracts image blocks at specified position (x, y) and having size of M×N pixels.

3. The device according to claim 1, wherein the variance matrix generating unit computes 3×3 luminance gradient variance-covariance matrix A.

4. The device according to claim 1, further comprising: a minimum value computing unit that computes the minimum value Emin of the evaluation function E.

5. The device according to claim 4, wherein,
the minimum value computing unit that computes the minimum value Emin, uses the elements of a variance-covariance matrix A generated by the variance matrix generating unit and the motion vector (u, v) computed by the motion vector computing unit, and further comprising:

a 2×2 eigenvalue computing unit that transforms the variance-covariance matrix A into a 2×2 matrix, assumes the difference value It=0 for the elements of the variance-covariance matrix A, and computes eigenvalues λ1, λ2; and a reliability determining unit that outputs the motion vector (u, v) when the minimum value Emin is not greater than a preset threshold value and the eigenvalues λ1, λ2 are not smaller than a preset threshold value.

6. The device according to claim 5, further comprising:
a correction unit that computes λ31, λ32 selected from the three eigenvalues obtained when the covariance matrix of the luminance gradient vectors is 3×3 in the descending order of magnitude on the basis of the eigenvalues λ1, λ2 computed by the 2×2 eigenvalue computing unit and the motion vector (u, v) computed by the motion vector computing unit, and the reliability determining unit is adapted to output the motion vector (u, v) when the eigenvalues λ31, λ32 are not smaller than preset threshold value.

7. The device according to claim 6, wherein
the correction unit computes eigenvector ξ1' that corresponds to the eigenvalue λ1 when the difference value is made to be It=0, produces the equation shown below:

$\cos^2 \varnothing = (m^t \cdot \xi'1)^2/(|m|^2 |\xi'1|^2)$

[where ø is the angle formed by the motion vector m and the eigenvector ξ1'] and makes corrections of $\lambda 31 = \sqrt{(1+|m|^2 \cos^2 \varnothing)} \lambda 1,$ $\lambda 32 = \sqrt{\{1+|m|^2(1-\cos^2 \varnothing)\}} \lambda 2.$ 8. A method for computing a motion vector by means of a gradient method, comprising:
a step of dividing an input moving image signal into a plurality of specified block regions;

a step of computing horizontal direction inter-pixel difference value Ix and vertical direction inter-pixel difference value Iy in a same frame and inter-frame temporal difference value It relative to different frame signals when the pixel expressed by coordinates (x, y, t) moves for a small-time in the image of the block regions produced as a result of the division, x being the coordinate value in the horizontal direction, y being the coordinate value in the vertical direction, t being the coordinate value in the temporal direction;

a step of generating a variance matrix by computing the variance of the gradient in the horizontal direction, the variance of the gradient in the vertical direction and the variance of the gradient in the temporal direction of a luminance value according to the move of the pixel in the small-time on the basis of the difference values Ix, Iy and It;

a step of computing a coefficient of a flat plane formula by calculation using a formula for giving a minimum with regard to the square error of the flat plane formula approximating the distribution of luminance gradients of the pixel; and a step of computing the motion vector using the computed coefficient, wherein evaluation function E is defined as $E=\Sigma\delta^2=\Sigma(\alpha Ix+\beta Iy+\gamma It)^2$, in the variance matrix generating step on an assumption that the luminance gradient vectors $(Ix, Iy, It)^t$ of all the pixels in the block regions are distributed on a two-dimensional plane expressed by $\alpha Ix+\beta Iy+\gamma It=\delta$, using normal vector $(\alpha, \beta, \gamma)^t$ of the plane.

9. The method according to claim 8, wherein
image blocks at specified position (x, y) and having size of M×N pixels are extracted in the step of dividing an input moving image signal into a plurality of specified block regions.

10. The method according to claim 8, wherein
3×3 luminance gradient variance-covariance matrix A is computed in the variance matrix generating step.

11. The method according to claim 8, further comprising:
a minimum value computing step that computes the minimum value Emin of the evaluation function E.

12. The method according to claim 11, wherein:
the minimum value computing step of computing the minimum value Emin, uses the elements of a variance-covariance matrix A generated by the variance matrix generating step and the motion vector (u, v) computed in the motion vector computing step, and further comprising:

a 2×2 eigenvalue computing step of transforming the variance-covariance matrix A into a 2×2 matrix, assuming the difference value It=0 for the elements of the variance-covariance matrix A, and computing eigenvalues λ1, λ2; and a reliability determining step of outputting the motion vector (u, v) when the minimum value Emin is not greater than a preset threshold value and the eigenvalues λ1, λ2 are not smaller than a preset threshold value.

13. The method according to claim 11, further comprising:
a correction step of computing $\lambda 31$, $\lambda 32$ selected from the three eigenvalues obtained when the covariance matrix of the luminance gradient vectors is 3×3 in the descending order of magnitude on the basis of the eigenvalues $\lambda 1$, $\lambda 2$ and the motion vector (u, v); and
the reliability determining step being adapted to output the motion vector (u, v) when the eigenvalues $\lambda 31$, $\lambda 32$ are not smaller than preset threshold value.

14. The method according to claim 13, wherein
the correction step is adapted to compute eigenvector $\xi 1'$ that corresponds to the eigenvalue $\lambda 1$ when the difference value is made to be It=0, produces the equation shown below:

$$\cos^2 \emptyset = (m^t \cdot \xi'1)^2 / (|m|^2 |\xi'1|^2)$$

[where ø is the angle formed by the motion vector m and the eigenvector $\xi 1'$] and makes corrections of $$\lambda 31 = \sqrt{(1+|m|^2 \cos^2 \emptyset)} \lambda 1,$$

$$\lambda 32 = \sqrt{\{1+|m|^2 (1-\cos^2 \emptyset)\}} \lambda 2.$$

* * * * *